US012786234B2

(12) United States Patent
Chapman

(10) Patent No.: US 12,786,234 B2
(45) Date of Patent: Nov. 3, 2026

(54) DETERMINING UNAUTHORISED REQUESTS FROM SENDERS OF AN ELECTRONIC COMMUNICATION

(71) Applicant: Egress Software Technologies IP Limited, London (GB)

(72) Inventor: Jack Alexander Chapman, London (GB)

(73) Assignee: Egress Software Technologies IP Limited, London (GB)

( * ) Notice: Subject to any disclaimer, the term of this patent is extended or adjusted under 35 U.S.C. 154(b) by 109 days.

(21) Appl. No.: 18/421,656

(22) Filed: Jan. 24, 2024

(65) Prior Publication Data

US 2024/0250988 A1 Jul. 25, 2024

(30) Foreign Application Priority Data

Jan. 24, 2023 (GB) ..................................... 2301006

(51) Int. Cl.
*H04L 9/40* (2022.01)

(52) U.S. Cl.
CPC ................................ *H04L 63/1491* (2013.01)

(58) Field of Classification Search
CPC ...... H04L 63/1491; H04L 63/14; G06F 21/55
See application file for complete search history.

(56) References Cited

U.S. PATENT DOCUMENTS 8,880,435 B1 * 11/2014 Catlett .................. G06Q 20/10 705/75
9,027,126 B2 * 5/2015 Larkins ................. G06F 21/554 713/184
9,503,451 B1 * 11/2016 Kane-Parry ........... H04L 63/083
10,855,722 B1 12/2020 Vadlamani
11,316,895 B1 * 4/2022 Wright ................ H04L 63/1483
2011/0167494 A1 7/2011 Bowen et al.
2018/0173891 A1 * 6/2018 Wang .................. G06F 21/6245
2020/0153836 A1 5/2020 Johnson et al.

FOREIGN PATENT DOCUMENTS

EP 3608815 A1 2/2020

OTHER PUBLICATIONS

International Search Report and Written Opinion dated Apr. 19, 2024 for PCT Application No. PCT/GB2024/050189.

* cited by examiner

*Primary Examiner* — Amir Mehrmanesh
*Assistant Examiner* — Thomas A Gyorfi
(74) *Attorney, Agent, or Firm* — EIP US LLP

(57) ABSTRACT

A method and server system for determining unauthorised requests, from a sender, for data pertaining to a recipient of an electronic communication, wherein the recipient is a user of, and has an authorized account with, the server system. The server system is configured to determine that the electronic communication is a potentially malicious communication, and then instantiate a pseudo account with associated login credentials associated with, and unused by, the recipient. Login credentials associated with the pseudo account are transmitted to the sender and access to the pseudo account is monitored. Characteristics of the access are associated with the pseudo account and then used to determine unauthorized requests for the data.

18 Claims, 3 Drawing Sheets

DETERMINING UNAUTHORISED REQUESTS FROM SENDERS OF AN ELECTRONIC COMMUNICATION

CROSS-REFERENCE TO RELATED APPLICATIONS

This application claims priority to UK Application No. GB2301006.9, filed Jan. 24, 2023, under 35 U.S.C. § 119(a). Each of the above-referenced patent applications is incorporated by reference in its entirety.

BACKGROUND

Technical Field

The present invention relates to a method, server system, and non-transitory computer-readable storage medium for processing and handling a request from a sender for data pertaining to a recipient of an electronic communication.

Background

Electronic communications are sent from senders to recipients over a network and can have contents which are designed to obtain certain details about the recipient. The contents of the communication may elicit information from the recipient to enable the sender to maliciously access data associated with the recipient. Communications such as these are often called phishing communications and have the aim of obtaining personal information, such as login details for the recipient's accounts.

Being able to detect such communications quickly and efficiently, can be relatively time-consuming and resource intensive. It is desirable to detect such communications and monitor actions undertaken by malicious parties who have gained access to the recipient's account and who attempt to obtain data associated with the recipient's account.

SUMMARY

According to aspects of the present disclosure, there are provided a method, a computer program product such as a non-transitory storage medium carrying instructions for carrying out the method, and a server system comprising at least a sending device, a recipient device, a storage system and a remote server configured to perform the method.

The method is one of determining unauthorised requests, from a sender, for data pertaining to a recipient of an electronic communication, the recipient being a user of, and having an authorized account with, a server system, wherein the server system comprises at least a remote server and a storage system, and maintains accounts for a plurality of users.

The method includes receiving, at the remote server, the electronic communication addressed to the recipient; determining, by the remote server, that the electronic communication is a potentially malicious communication, and then instantiating, by the remote server, a first pseudo account with associated login credentials of a first type, the first pseudo account being associated with, and unused by, the recipient, and wherein the first, empty, pseudo account is different to the authorized account; and the login credentials of the first type are login credentials comprising characters that have been randomly generated for use in accessing the first pseudo account; transmitting, to the sender of the electronic communication, by the remote server, at least the login credentials of the first type; monitoring, by the remote server, access to the first pseudo account by a given user of the server system, using the login credentials of the first type, wherein the given user is not associated with any of the accounts maintained by the server system; and associating, by the remote server and in the storage system, at least one characteristic of the access, by the given user of the server system, to the first pseudo account with the login credentials of the first type, wherein the at least one characteristic of the access to the first pseudo account is used in determining unauthorised requests for the data.

By instantiating a pseudo account and transmitting login credentials for the pseudo account, rather than the login credentials associated with the recipient's authorized account when it is determined that the communication is potentially malicious, analysis can be undertaken regarding whether the sender of the communication is in fact acting in a malicious manner. This prevents a potential attacker from gaining access to the authorized account of the recipient, whilst the storing of characteristics associated with the pseudo account enables future analysis to be undertaken improving the determination of whether subsequently received communications are likely to be malicious. Furthermore, this also enables information to be gathered about the type of access and information sought out by the attacker enabling feedback to the recipient, and/or system manager, to be provided thereby informing future security decisions/policies.

The method may also comprise instantiating, by the remote server, at least a second pseudo account with associated login credentials of a second type, the second pseudo account being associated with, and unused by, the recipient, and wherein the second pseudo account is different to the authorized account and the first pseudo account. The second pseudo account comprises dummy data representative of a given account of the server system and the login credentials of the second type represent dummy login credentials for accessing the given account. The method may further comprise transmitting, to the sender of the electronic communication, by the remote server, the login credentials of the second type; monitoring, by the remote server, access to the second pseudo account by the given user of the server system, with the login credentials of the second type; and associating by the remote server, and in the storage system, at least one characteristic of the access by the given user of the server system, to the second pseudo account with the login credentials of the second type, wherein the at least one characteristic of the access to the second pseudo account is used in determining unauthorised requests for the data.

By instantiating a second pseudo account with login credentials of a different type, checks can be made to determine whether access is also attempted to the second pseudo account. Characteristics associated with the access to the second pseudo account can also be stored enabling further future analysis of communications to be more efficient and accurate. This also provides additional information regarding what information the malicious party was attempting to access thereby informing security policy/decisions by the recipient and/or system manager.

Optionally, the method comprising determining whether access, by the given user, to the first pseudo account or the second pseudo account is automated, based on a comparison of the at least one characteristic of the access to the first pseudo account by the given user, and the at least one characteristic of the access to the second pseudo account by the given user, wherein the at least one characteristic of the access to the first pseudo account and the at least one characteristic of the access to the second pseudo account are indicative of at least whether the login credentials are of the first type or the second type.

By comparing the access to the first pseudo account and the second pseudo account by a given user, the characteristics and/or features of the given user and the actions or intentions may be determined. An analysis of the login credentials used to access the pseudo account(s) indicates that the login credentials of the first type are machine-generated, that is they comprise random characters and therefore this may be used to indicate that the first pseudo account is a fake account in comparison to the second pseudo account which comprises more realistic login credentials alongside dummy data.

Optionally, an analysis of data that is accessible via the Internet from one or more repositories is undertaken to determine whether at least the login credentials of the first type, associated with the first pseudo account, have been made available via the one or more repositories, or the login credentials of the second type, associated with the second pseudo account, have been made available via the one or more repositories. This enables data held by remote servers to analysed for the login credentials provided to the pseudo account or further pseudo account. These remote servers may be known to comprise illicitly obtained information and provides useful information regarding how the attacker is using the credentials and potentially what their aims are. Furthermore, this also helps to improve the analysis/determination as to whether future communications are potentially malicious.

The at least one characteristic of the access to the first pseudo account and the at least one characteristic of the access to the second pseudo account may comprise information associated with one or more actions undertaken by the given user. By monitoring actions undertaken by a user accessing the pseudo account(s) using the login credentials, information about what malicious third parties are doing with the credentials and what information they are attempting to access can be obtained. This helps to further inform the security policy of the recipient and also improve future detections/actions likely to be classed as malicious activity.

The at least one characteristic of the access to the first pseudo account, and the at least one characteristic of the access to the second pseudo account may be any of identification information associated with the given user accessing the first pseudo account with the login credentials of the first type or the given user accessing the second pseudo account with the login credentials of the second type; and a time associated with the access, by the given user, to the first pseudo account with the login credentials of the first type or the access to the second pseudo account with login credentials of the second type. Storing identification information of a malicious third party, or any other user accessing the pseudo account(s) using their respective login credentials enables further access to accounts to be monitored, whether they be an authorized account of the server system, or pseudo accounts, by those malicious third parties. Furthermore, other communications received from those malicious third parties can also be identified quickly and flagged as potentially malicious. This improves the detection and accuracy of the identification of potential attackers.

Optionally, a difference between a transmission time of the login credentials of the first type or the login credentials of the second type to the sender, and the time associated with the access to the first pseudo account or the access to the second pseudo account by the given user may is determined. When the difference is below a predetermined threshold, it may be determined that the given user is the sender of the electronic communication. By tracking the time between providing the sender with the login credentials and access to the pseudo account(s), information can be gleaned as to whether the sender is likely to have used the information themselves, or whether it is likely that the credentials have been shared with another malicious third party. The credential may be used by either party in a number of ways, such as by providing them to a bot for automated attacks, or by manually inputting the login credentials.

A time period between the time associated with the access to the first pseudo account or the access to the second pseudo account by the given user, and an action time associated with an action undertaken by the given user in the first pseudo account or the second pseudo account may also be determined. By tracking the time between accessing the account and a time a user undertakes an action within the pseudo account, an indication of whether the attack is automated can be determined. If the action happens very quickly after access, it may be indicative of an automated attack. Actions detected may include the sending a communication using the pseudo account, the downloading data from the pseudo account and/or attempting to modify or create administrative rules associated with the pseudo account. This helps to inform the security policy of the recipient and also improves future detections/actions likely to be classed as malicious activity.

Optionally, previous access characteristics stored in the storage system are identified, where the previous access characteristics are associated with one or more of: previous accesses to one or more accounts of the server system; and a comparison between the previous access characteristics to the characteristics associated with the access to the first pseudo account by the given user of the server system. A similarity between the previous access to the one or more accounts of the server system and the access to the first pseudo account by the given user may be determined and an indication may be transmitted to the recipient based on the comparison. By providing an indication based on a comparison between characteristics of a given access to the pseudo account and previous accesses, patterns and analysis can be undertaken, and malicious activity detected. This helps to inform the security policy of the recipient and also improves future detections/actions likely to be classed as malicious activity.

Further features and advantages of the invention will become apparent from the following description of preferred embodiments of the invention, given by way of example only, which is made with reference to the accompanying drawings.

DETAILED DESCRIPTION

Electronic communications may be sent between senders and recipients on a data network. Due to the increased number of interconnected devices, such as smartphones, laptop computers, wearable devices and desktop computers, users can access data at various physical locations, provided they have an appropriate connection. Accordingly, users may be able to send and/or receive electronic communications from various locations, at various times, using different devices. Being able to manage, track, and determine the devices that a user sends and receives data packages from, enables a system to make determinations as to the veracity of the sender and/or recipient, and as such determine whether additional measures need to be employed. For example, determining whether indicate to a recipient the risk of a potential threat or prevent the recipient from opening or sending a data package.

Determining the level and type of processing to apply, may comprise analysing several pieces of information, such as information relating to previous interactions between the sender and recipient, the content of the electronic communication, and in some examples, data from additional data services.

Information relating to the sender and recipient of the electronic communication, as well as the contents of the electronic communication may be used as the basis for determining handling actions to apply, wherein a particular handling action is indicative of the risk associated with the given electronic communication. For example, a high-risk electronic communication may result in specific safeguards being put in place to prevent recipients from accessing the electronic communication. Alternatively, if the risk score is high enough to indicate a severe risk, it may be determined that the electronic communication should be quarantined and/or amended in such a way as to negate and/or reduce at least some of the risk.

Determining the risk a given electronic communication poses may involve the use of different functions, and in some examples may involve machine learning functions configured to analyse different characteristics of the electronic communication, the sender, and the recipient. Being able to determine the risk and apply handling actions quickly and efficiently is necessary to ensure that users are not frustrated due to the delay in receiving the electronic communication. If they are frustrated or annoyed due to the amount of time, and lag or latency in determining the risk and providing access to the electronic communication, or a notification of a risky electronic communication, then this may lead them to deactivate, or simply never enable the system, and as such serve to increase the risk of a threat.

By analysing the content of the electronic communication in such a way, further measures can be put in place to determine the type and level of threat, and track any malicious activity associated with the electronic communication, as will be described below.

Figure 1:
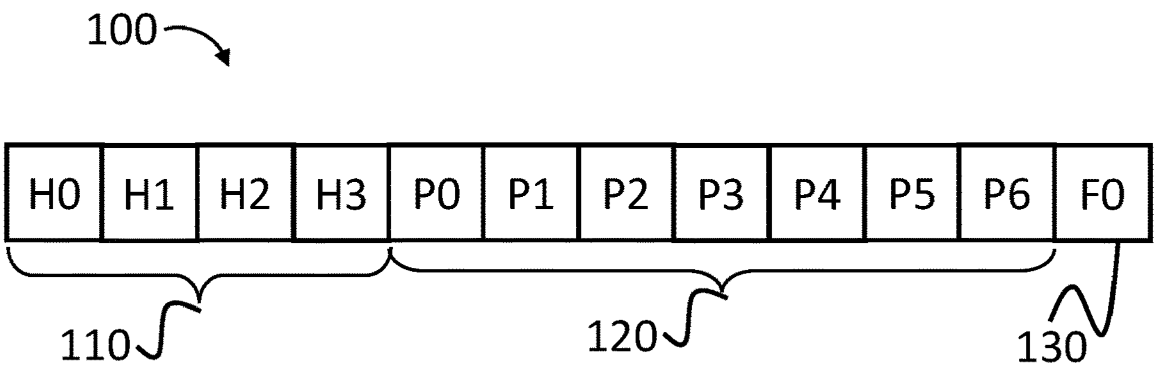
FIG. 1 is a schematic representation of an exemplary data package according to an example.

FIG. 1 is a schematic representation of an exemplary electronic communication 100 according to an embodiment. The electronic communication 100 comprises a header 110, payload data 120, and a footer 130, and may form part of a larger data file. The electronic communication 100 may be, or may comprise, an email, multimedia file, program for execution on a computing device or any other suitable data. The electronic communication 100 may be split into a number of smaller data portions H0 . . . H3; P0 . . . P6; F0. In some cases, each of these portions may represent individual bits of data. Whilst the electronic communication 100 of FIG. 1 comprises 11 data portions, it will be appreciated that the electronic communication 100 may comprise a larger or smaller number of data portions.

The header 110 of the electronic communication 100 may comprise information regarding the payload data, for example, the header may include data portions relating to the length of the electronic communication 100, synchronization data, a package number, network protocols that define what type of information is contained in the payload data, a destination address, an originating address, and a location of the sender and/or recipient. It will be appreciated that other types of data portions and any combination of those data portions may be included in the header 110.

The payload 120 of the electronic communication 100 may comprise data associated with the content to be transmitted from the sender to the recipient. For example, the payload 120 may comprise data associated with an email message or multimedia file, or a combination of files such as an email with an attachment. The payload 120 may comprise at least one data portion, which as mentioned above may be representative of individual bits of data. The data portions may also represent collections of individual bits, or even different data items. For example, the payload 120 of an electronic communication 100 may comprise data relating to an email, and a number of attachments to the email. As such, the payload 120 need not be representative of a single data item to be transmitted from a sender to a recipient. Similarly, the payload 120 may represent a portion of a data item. For example, where the data item to be transmitted from a sender to a recipient is a large data file, such as a multimedia file, the electronic communication 100 may represent only a portion of that data file. In such examples, the header 110 may be used to indicate the order of the electronic communications 100 making up the large data file.

The electronic communication 100 may also comprise a footer 130. The footer 130 may be used for verifying the contents of the electronic communication 100 on transmission, but it will be appreciated that the footer 130 may also comprise other data. For example, the footer 130 may be a checksum and comprise a data portion F0 used for error checking, such as a cyclic redundancy check or other similar methods. As with the header 110 and payload 120, whilst the footer 130 is shown as a single data portion F0, it will be appreciated that the footer 130 may comprise more than a single data portion.

Figure 2:
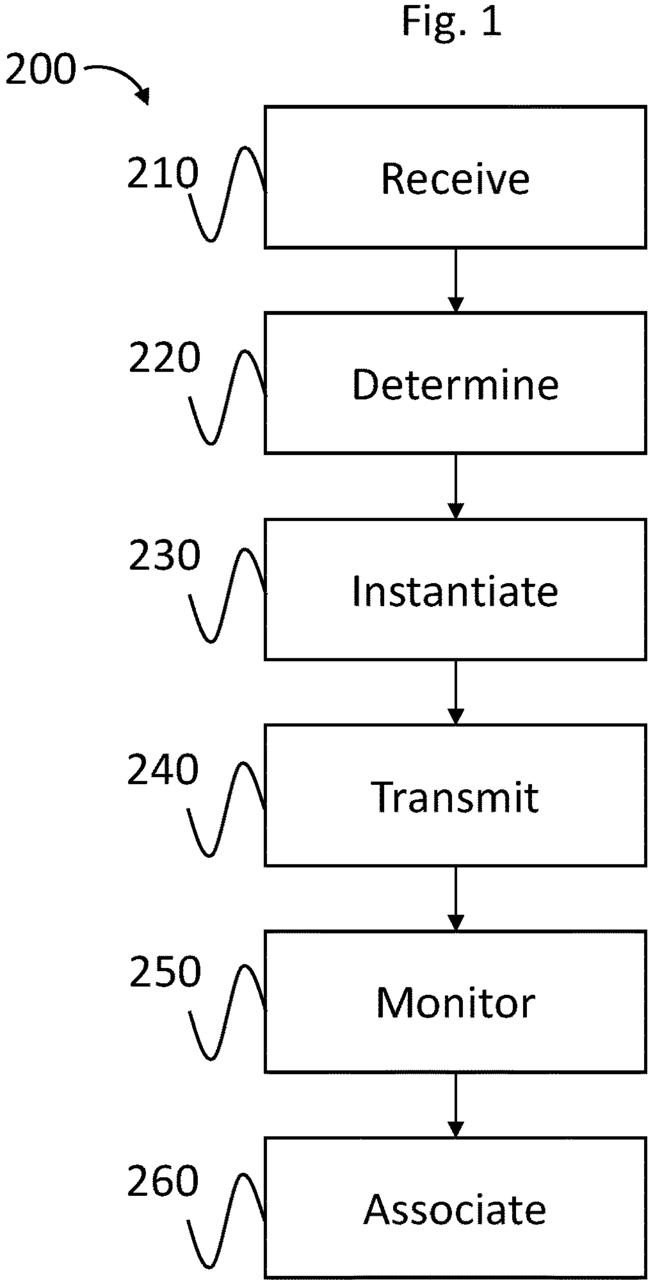
FIG. 2 is a flowchart showing a method for determining and handing unauthorized requests, from a sender, for data pertaining to a recipient of an electronic communication, according to an example.

FIG. 2 is a flowchart showing a method 200 for determining unauthorised requests, from a sender, for data pertaining to a recipient of an electronic communication, such as the electronic communication 100 described above in relation to FIG. 1. The recipient of the electronic communication 100 is a user of a server system, who has an authorized account associated with the server system. For example, server system may be an email server system, a server system associated with a financial service (such as a bank account), or may be any other system where a user is required to validate their identity by entering login credentials of some type. The authorised account may have login details, such as a username and/or password, either in the form of characters entered by a user into a login or password field, and/or some other form of authentication such as biometric data. In some examples, there may be multiple levels of security for logging into the authorized account, such as two-factor authentication.

The server system may be the server system 500 described below with reference to FIG. 5 and more particularly may comprise at least a remote server and a storage system. The server system is configured for maintaining accounts for a plurality of users, such as the authorised account described briefly above.

At step 210, an electronic communication, such as electronic communication 100 described above with reference to FIG. 1 is received at the remote server of the server system. The electronic communication 100 may be received at the remote server via a network connection, such as via the internet, or a direct connection to a server or other computing devices, such as a user device and/or recipient device. The electronic communication 100 may be an email, or other electronic communications, such as an instant message or SMS message. It will be appreciated that other types of electronic communications may also be received. Furthermore, in yet other examples, a data package may be received, wherein the data package comprises an electronic communication and/or other data which may be used to obtain data from the recipient, such as the aforementioned account credentials.

The electronic communication, or data package, may contain hyperlinks, and/or other code configured to obtain user account and/or other personally identifying information, such as names, addresses, date of birth, and bank account information, associated with the recipient. The user account data and/or other personally identifying information may be stored on the recipient's device and/or stored remotely but associated with their authorized account.

Following receipt of the electronic communication, it is determined at step 220, by the remote server, whether the electronic communication is potentially malicious. It will be appreciated by the skilled person that there are a number of methods for determining whether a given electronic communication is potentially malicious. Examples of such methods include analysing the data contained within the electronic communication, such as the sender's address, other recipients, whether there is an attachment to the electronic communication, and the content of any message and/or attachment. Other features of the electronic communication may also be used to determine whether it is malicious, such as the time the electronic communication has been received, data in the header such as redirection information, and an analysis of any hyperlinks within the body of the electronic communication.

Analysing the electronic communication to determine whether it is a potentially malicious communication based on any of the above-mentioned data associated with the received electronic communication, may be undertaken by a machine learning algorithm, or other forms of analysis as will be appreciated by the skilled person. The analysis of the electronic communication may be based on a plurality of the data in order to obtain a holistic view as to whether the electronic communication poses a potential threat.

Figure 3A:
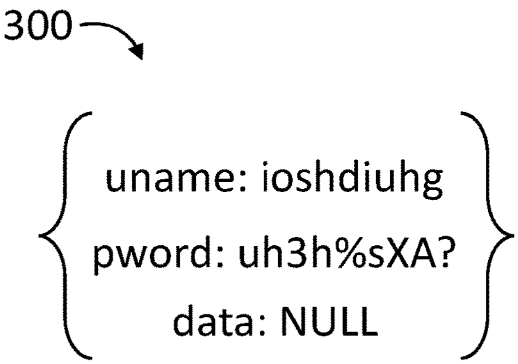
FIG. 3A is a schematic representation of a pseudo account with login credentials comprising randomly generated characters according to an example.

Following the determination, by the remote server, as to whether the electronic communication is a potentially malicious communication, at step 230, the remote server instantiates at least a first pseudo account. The first pseudo account is associated with the recipient of the electronic communication and may have a number of features specific to it. More particularly, the first pseudo account contains no data and has not been used by the recipient, therefore it is completely separate from their authorized account. For example, the first pseudo account may be the pseudo account 300 of FIG. 3A. Even though the first pseudo account 300 contains no data, it still has associated login credentials which are of a first type, such that they are randomly generated, and do not have any reference and/or connection to the recipient of the electronic communication. These login credentials enable a malicious third party to access the first pseudo account 300. In such an example, the username and password of the first pseudo account 300 may comprise random characters, and the first pseudo account 300 has no other data associated with it. That is, the first pseudo account is empty. In some embodiments, the first pseudo account may contain some bogus data which upon inspection would indicate that the first pseudo account is a fake or bogus account. For example, the bogus data may comprise randomly generated data and/or may be unintelligible data. Whilst the first pseudo account is associated with the recipient, it is different to the authorized account that the recipient uses. This enables any potentially malicious activity undertaken by the sender or another third party using the first pseudo account 300 to have no effect on the recipient's authorized account.

For example, a user may receive a communication from a sender which is deemed, at step 220 to be malicious, and which is requesting the recipient's banking information. The remote server may deem this message to be malicious using various methods as will be appreciated by the skilled person. Following the determination, the remote server would instantiate a pseudo banking account. The pseudo banking account has associated login credentials, such as a username and password. As part of the instantiation of the pseudo banking account, there is no other data or structure set up. This is in contrast to the user's 'real' banking account would have data associated with it, such as transaction history or direct debit information, etc. However, the pseudo banking account does not have any of this associated data.

In another example, a user may receive a communication from a sender which is deemed, at step 220, to be malicious and which is requesting the user's email login information. The remote server will then instantiate a pseudo email account on the remote server. The pseudo email account has login credentials associated with it. As part of the instantiation of the pseudo email account, there is no other data or structure set up. This is in contrast to the user's 'real' email account, which would have data associated with it such as a mailbox or contacts list. However, the pseudo email account does not have any of this associated data.

Figure 3B:
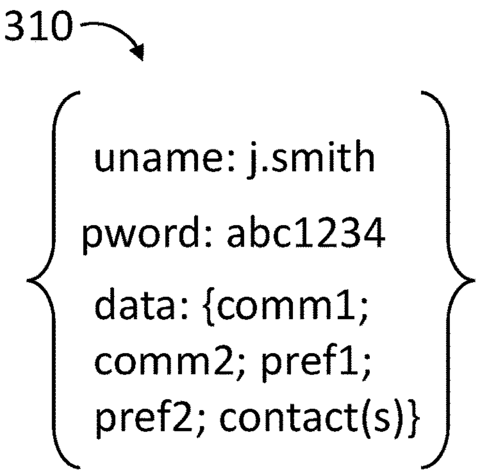
FIG. 3B is a schematic representation of a pseudo account with login credentials comprising dummy data and dummy login credentials according to an example.

In some examples, at step 230, the remote server may instantiate a second pseudo account with associated login credentials of a second type. As with the first pseudo account, the second pseudo account may be associated with the recipient of the electronic communication and may have a number of features specific to it. The second pseudo account, much like the first pseudo account, has not been used by the recipient, such that it is completely separate from their authorized account. The second pseudo account may be the pseudo account 310 of FIG. 3B. That is, the second pseudo account 310 may have so-called dummy login credentials. The dummy login credentials may represent realistic login credentials for the recipient. For example, where the recipient's name is 'John Smith' the username for the dummy login credentials may be 'j.smith' whereas the username associated with the authorized account may be 'jsmith'. Other features of the second pseudo account 310 may also emulate realistic data. For example, the second pseudo-account may have corresponding dummy data which is used to emulate or replicate the data in a realistic account of the server system. Such dummy data may comprise a fake and/or synthetic communication history comprising a plurality of electronic communications with other users of the server system, which may or may not be pseudo accounts themselves. The dummy data may also comprise preference information and contact information specifically generated for use by a pseudo account.

Both the first pseudo account 300 and/or second pseudo account 310 may be generated and then instantiated by the server system, on detection of the potentially malicious communication. In other examples, the first pseudo account 300 and/or second pseudo account 310 may be configured from one or more pseudo accounts objects stored in a storage associated with the server system. As part of the instantiation, the pseudo account object may be configured with the login credentials (either of the first type or second type), and in the case of the second pseudo account 310, configured with dummy data from a database stored on the storage.

Once the pseudo account—either the first pseudo account 300 on its own, or the first pseudo account 300 and the second pseudo accounts 310—has been instantiated, at step 240, at least the login credentials associated with the pseudo account(s) 300, 310 are transmitted to the sender of the electronic communication. The transmission of the login credentials may be via the internet, or a direct connection to a server of other computing devices, such as a user device and/or recipient device. In some examples, the transmission of the login credentials may occur automatically if it was determined that the electronic communication is a potentially malicious communication. For example, upon detection, by the remote server at step 320, that a received electronic communication is potentially malicious, the remote server may instantiate and then transmit the details associated with the first pseudo account 300 and/or the second pseudo account 310 to the sender instead of the recipient's authorized account information.

Following the transmission of the pseudo account information (whether it is the first and/or second pseudo account information), at step 250, the remote server monitors access to the pseudo account(s) 300, 310 by a user of the system, using the login credentials associated with the pseudo account(s) 300, 310. Monitoring access to the pseudo account(s) may involve tracking whether a user has logged in using the associated login credentials. For example, where a first pseudo account 300 is instantiated, the first pseudo account 300 can be monitored to determine whether any user of the server system or any third party logs in using the login credentials of the first type. Similarly, where a second pseudo account 310 is instantiated, the second pseudo account 310 can be monitored to determine whether a user has logged in using the login credentials of the second type. Furthermore, in some examples, different login credentials may be provided for different requests, therefore it is possible to monitor which request the access is associated with.

As the user accessing the first or second pseudo account 300, 310 is not associated with any other account of the server system, then by providing the potentially malicious user with access to the pseudo account instead of a user's authorized account, security is maintained, and access to personally identifiable and/or other confidential information, by such an unauthorized user, is prevented. Following on from the banking and email examples described above in relation to step 230, the pseudo banking account is implemented on the remote server which is distinctly separate from the user's banking provider's server. Similarly, the pseudo email account is implemented on the remote server, and that is also distinctly separate from the user's email provider's server. This allows access to and actions performed by the malicious third party to be undertaken at a safe distance from the legitimate servers, ensuring that information about the malicious third party can be determined at a safe distance as will be described in further detail below.

Each access to the first and/or second pseudo account 300, 310 may have a number of associated characteristics. For example, the type of login credentials used for the access, identification information associated with the user accessing the pseudo account(s) 300, 310, and a time of the access to the pseudo account(s) 300, 310. The identification information associated with the malicious user accessing the pseudo account(s) 300, 310 may include information such as an Internet Protocol (IP) address associated with the malicious user's device, the geographic location of the malicious user, and a domain of the source of the of the access. It will be appreciated that other characteristics may also be associated with the access.

In other examples, the characteristics may comprise information associated with one or more actions undertaken by the malicious user when they have gained access to the pseudo account(s) 300, 310 using the login credential provided. Such actions include but are not limited to an attempt to send one or more electronic communications using the pseudo account(s) 300, 310, an attempt to download data associated with the pseudo account(s) 300, 310, and an attempt to change one or more administrative rules associated with the pseudo account(s) 300, 310 such as forwarding rules. Other actions may also be monitored and tracked.

Further information about the access may also be gleaned based on whether the login credentials of the first and/or second type for the first pseudo account 300 and the second pseudo account 310 respectively have been provided to one or more third parties via an online repository accessible via the Internet. For example, if the login credentials to either of the first or the second pseudo account 300, 310 are detected on known malicious sites, it can be determined that the request for data from the recipient was malicious. Characteristics of that request can then be stored and used when analysing further electronic communications as an indication that a given electronic communication may be malicious.

Once an attempted access to the first and/or second pseudo account 300, 310 has been detected, and the characteristics of that access have been determined, then, at step 260, the access to the pseudo account 300, 310, and characteristics of the access attempt are associated with the pseudo account 300, 310. These access characteristics are used to determine whether the request for data from the sender is likely to be unauthorized, for example by analysing the characteristics and determining whether they have the features of similar unauthorized requests. This association may be stored in storage associated with the server system, such that the access and its characteristics can be used in future determinations regarding whether a request for data from a recipient is likely to be malicious, further improving the accuracy of the detection algorithms used in step 220, for example.

Features of an unauthorized request may be determined in a number of ways which are apparent to the skilled person, and may for example, comprise determining whether the access to the pseudo account 300, 310 was undertaken by a real-world malicious third party, or the sender. This access may be automated, such as using a bot, or may be undertaken manually by entering the login credentials associated with pseudo account(s) 300, 310. Determining whether the access was automated may be based on the pseudo account 300, 310 accessed and/or the type of login credentials used. Access to the first pseudo account 300, which contains no data (or bogus data as described above), and may have login credentials comprising randomly generated characters may be used to indicate that the access was automated. This is because it is unlikely that a real-world malicious third party would analyse the pseudo account and/or its login credentials and consider them to be representative of a so-called 'real' account. Conversely, if an access is detected to the second pseudo account 310, which comprises data that emulates a so-called 'real' account of the server system, and has login credentials of the second type representative of realistic login credentials as described above, this may be indicative of a real-world malicious third party accessing the second pseudo account 310.

Other indications of whether the access to the pseudo account 300, 310 is undertaken automatically or by a real-world malicious third party may include determining a difference between the transmission time of the login credentials to the sender and the time that the access to the pseudo account 300, 310 was detected.

In yet further examples, the time between the transmission of the login credentials and the time at which an action was attempted/undertaken may be indicative of whether the access and/or action was performed by the sender of the electronic communication. If, for example, the action was attempted within a short period of time after the transmission of the login credentials associated with the pseudo account(s) 300, 310, such as when the time period is below a given predetermined threshold, this may be indicative that the sender of the communication is the one attempting to access and/or perform an action. Otherwise, if the time between the transmission of the login credentials associated with the pseudo account(s) 300, 310 exceeds the given predetermined threshold, then this may be indicative that a malicious third party, who is not the sender of the electronic communication, is attempting to access the pseudo account(s) and/or perform an action. For example, the malicious third party may have obtained the login credentials associated with the pseudo account(s) 300, 310 via one or more online repositories as described above.

It will be appreciated that other indications as to whether the access and/or actions were undertaken automatically or by a real-world malicious third party may also be used and/or combine with the above-described examples.

By allowing access to and actions to be performed by the malicious third party on the remote server, using the pseudo account, the malicious activity can be undertaken at a safe distance from the legitimate servers of the user. This ensures that information about the malicious third party can be determined at a safe distance.

In some examples, it is desirable to notify the recipient of the electronic communication of an attempt to access their authorized account. In such an example, the characteristics of the access to the pseudo account(s) 300, 310, such as the time of the access and the attempted actions, may be compared to previous access and/or action information associated with one or more given accounts of the server system, which are stored in a storage system associated with the server system. Similarities between the attempted access to the pseudo account(s) 300, 310, and previous access to one or more accounts may then be used to determine whether the access has the hallmarks of a malicious access. An indication may then be transmitted to the recipient based on the comparison, to alert the recipient of the fact that an attempt to obtain data associated with their account has been detected. Details regarding the attempt may be provided in the indication, such that the recipient can provide feedback indicating whether it is a malicious access attempt. The recipient's feedback may be stored in the storage system and then used to determine whether future attempts to access the recipient's authorized account (or other recipients with authorized accounts associated with the server system) are malicious or not.

Figure 4:
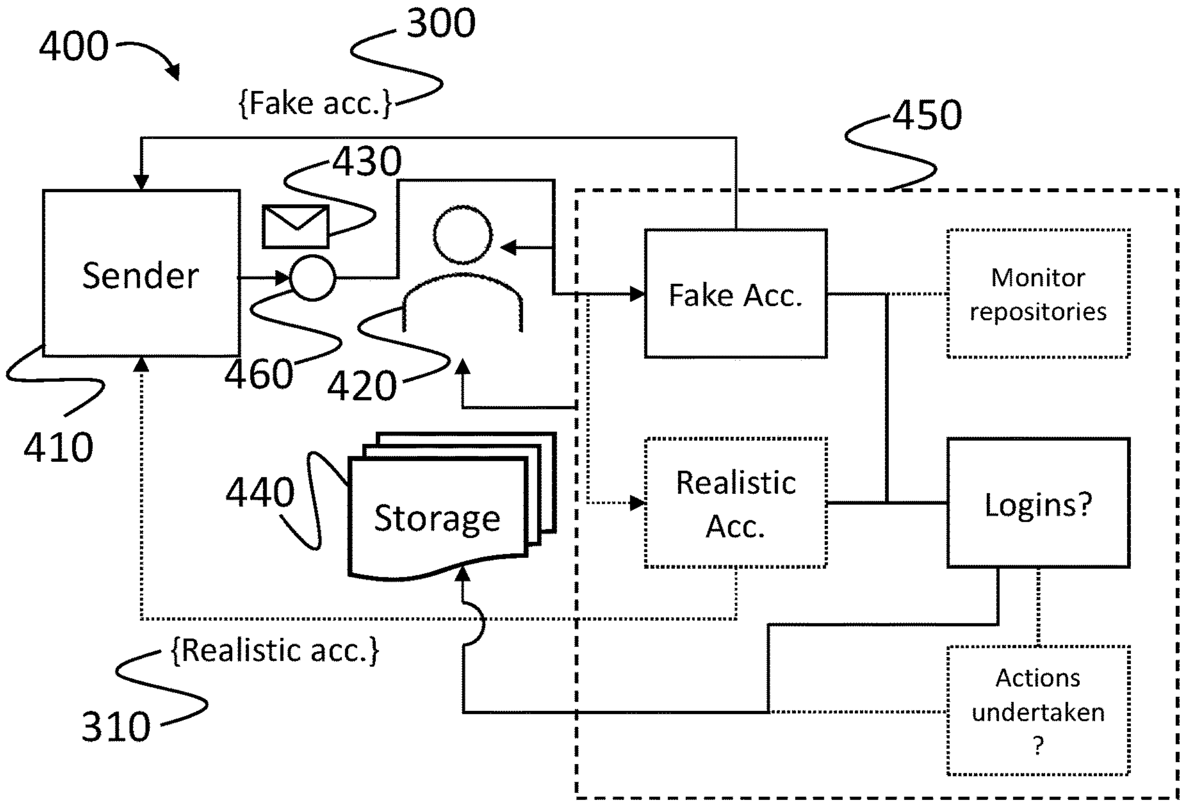
FIG. 4 is an exemplary representation of determining and handling unauthorized requests, from a sender, for data pertaining to a recipient of an electronic communication.

FIG. 4 is an exemplary representation 400 of determining and handling unauthorized requests, from a sender 410, for data pertaining to a recipient 420 of an electronic communication 430. The electronic communication 430, may be electronic communication 100 described in relation to FIG. 1, or may be another data package comprising malicious code configured to maliciously obtain data from the recipient 420 and transmit it to a third party, such as the sender 410. It will be appreciated that whilst the electronic communication 430 is shown as an email message, any other type of electronic communication, such as an instant message or an SMS message may also be used.

Upon receipt of the electronic communication 430, an analysis is undertaken to determine whether the electronic communication 430 is likely to be malicious. If it is determined that the electronic communication 430 is unlikely to be a malicious message, it may be passed directly to the recipient 420. It will be appreciated that this may involve the electronic communication 430 passing through a server, such as server 460 before being delivered to the recipient 430. The server 460 may be different to the remote server 450 configured to undertake the method 200 described above in relation to FIG. 2. For example, the server 460 may be an SMTP email server configured to handle the sending and receiving of electronic communications between the recipient's and sender's email accounts. Although it will be appreciated that the server 460 and the remote server 450 may be the same, and the remote server 450 may comprise further hardware to handle the transmission of electronic communications 430.

Where the server 460 is different to the remote server 450 undertaking the method 200 described above, the server 460 may be configured to first transmit the electronic communication 430 to the remote server 450 such that it can be handled in accordance with method 200 described above. It will be appreciated that in some examples the functionality of method 200 described above may be split between the server 460 and the remote server 450. For example, the server 460 may be configured to identify/determine whether the electronic communication 430 is a malicious communication, whereas the remote server 450 may be configured to instantiate pseudo accounts and monitor access and/or actions undertaken by a third party.

When it is determined that the electronic communication 430 is likely to be malicious, and as will be described in further detail below with reference to the server system 500 of FIG. 5, the remote server 450 is configured to instantiate at least a first pseudo account 300 with login credentials comprising randomly generated characters and comprising no data. At least the login credentials are then transmitted to the sender 410 of the electronic communication 430. As described above, the remote server 450 may also be configured to instantiate a second pseudo account 310 comprising realistic login credentials and data emulating a given user account of the server system. These realistic login credentials may also be transmitted to the sender 410. The remote server 450 is then configured to monitor for access to the pseudo account(s) 300, 310 for any attempted logins.

Characteristics associated with the login attempts to the pseudo account(s) 300, 310 may then be stored in storage 440. In some examples, the storage may be storage associated with either the server 460 or the remote server 450 or may be entirely remote from both.

In addition to monitoring access to the pseudo account(s) 300, 310, the remote server 450 may also be configured to monitor for one or more actions undertaken by a user when they access the pseudo account(s) 300, 310 using the associated login credentials. For example, the remote server 450 may be configured to monitor for attempts to send an electronic communications using the pseudo account(s) 300, 310, to download data associated with the pseudo account(s) 300, 310, and/or any attempt to change one or more settings or administrative rules of the pseudo account(s) 300, 310. It will be appreciated that the remote server 450 may be configured to monitor for other actions undertaken by the malicious user when they achieve access to the pseudo account(s) 300, 310.

The remote server 450 may also be configured to monitor one or more online repositories accessible via the Internet. These repositories may be known to store login credentials that have been maliciously obtained, however, it will be appreciated that they may also store other data. By monitoring such repositories, information about the purpose of the electronic communication 430 sent to the sender 410 can be deduced and used to determine whether future electronic communications are malicious.

Data and/or characteristics associated with the access and any actions attempted and/or undertaken in the pseudo account(s) 300, 310 may be used to generate an indication which is transmitted to the recipient 420.

As described above with reference to method 200 of FIG. 2, a number of other characteristics associated with the access and/or attempted actions may be stored in the storage 440, such that the remote server 450 (or server 460 when the server 460 is configured to undertake the analysis) can use these characteristics to determine whether a future electronic communication 430 is a malicious communication. Furthermore, by storing the characteristics, an analysis of the attempted accesses/actions can be undertaken to provide additional information as to the motives of the sender 410 of the electronic communication, whilst also improving the accuracy of detecting whether an electronic communication is a malicious communication.

Figure 5:
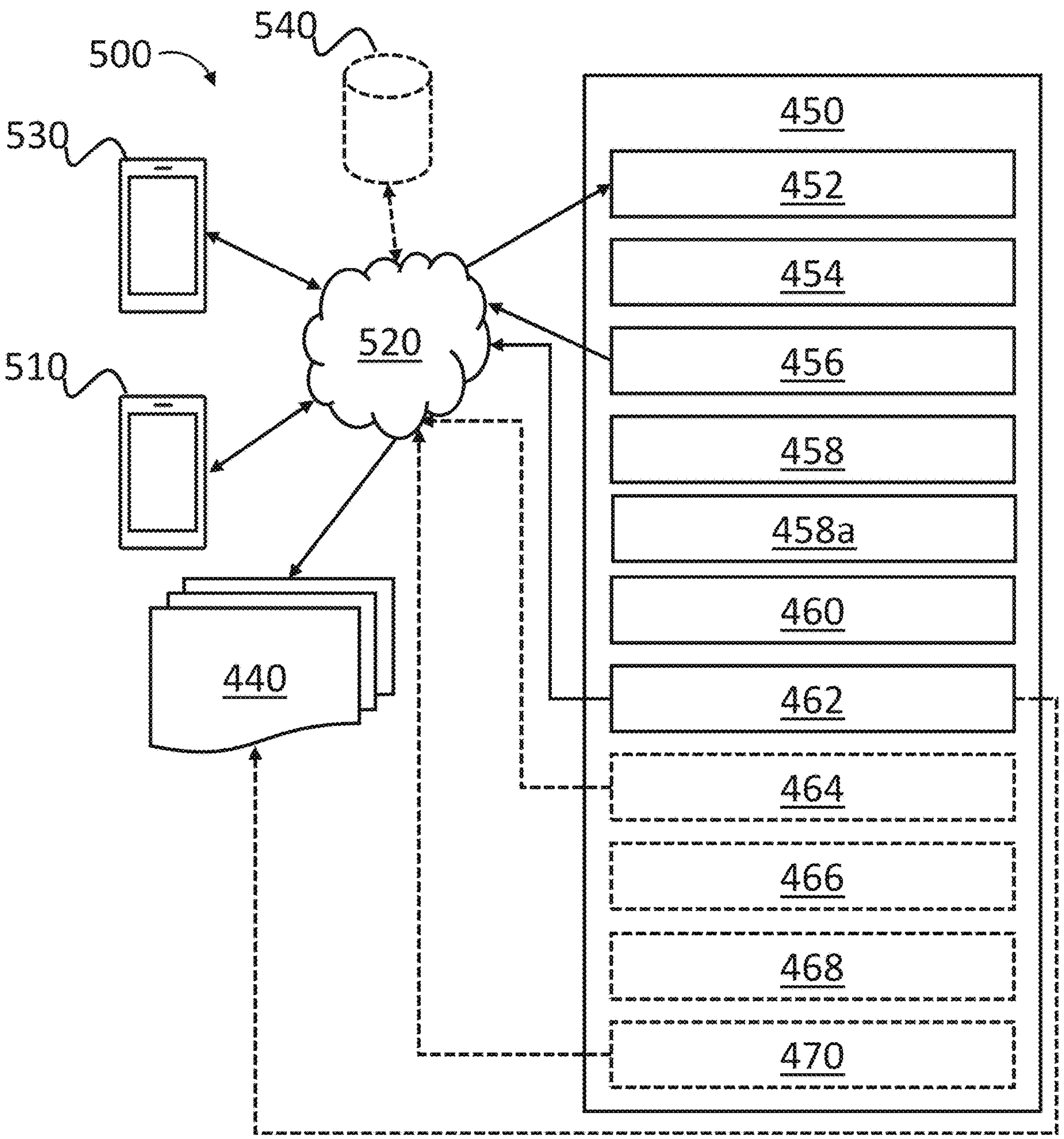
FIG. 5 is a schematic representation of a system for determining and handling unauthorized requests, from a sender, for data pertaining to a recipient of an electronic communication, according to an example.

FIG. 5 shows a system 500 comprising hardware components configured for determining and handling unauthorized requests, from a sender, for data pertaining to a recipient of an electronic communication in accordance with method 200 described above in relation to FIG. 2. The system 500 comprises at least one sending device 510 and at least one recipient device 570. The sender and recipient devices 510, 530 may be any suitable device for sending and/or receiving electronic communications. For example, the sender and recipient devices 510, 570 can be a mobile telephone, hand-held or laptop device, a desktop computer, a multiprocessor system, a microprocessor-based system, or a programable consumer electronic device comprising appropriate transmitting and/or receiving capabilities. To facilitate the transmission and/or receiving capabilities, the sender and recipient devices 510, 530, may comprise a network adaptor (not shown) that is arranged to facilitate communication with any number of remote resources via a network 520 such as a local area network (LAN), a general wide area network (WAN), and/or a public network (e.g. the Internet). The network adaptor may be configured to communicate using either a wired or wireless communication method, such as cellular connectivity (LTE, 3G, 4G, or 5G), ethernet, or over a Wi-Fi network. It will be appreciated that other types of sender and recipient devices 510, 530, and transmitting and/or receiving capabilities may be used.

The system 500 also comprises a storage system 440 having storage for storing at least the data associated with previous access to one or more pseudo accounts 300, 310. The storage system may also be configured to store a plurality of pseudo accounts which may be instantiated by the remote server for use in the method 200 described above. The storage of the storage system 440 may be a solid-state drive (SSD) or other semiconductor-based RAM; a ROM, for example, a CD ROM or a semiconductor ROM; a magnetic recording medium, for example, a floppy disk or hard disk; optical memory devices in general, although it will be appreciated that other storage mediums may be used. The storage system 440 may be accessed via a local area LAN, a WAN, and/or a public network (e.g. the Internet) via the network adaptor. Whilst the storage system 440 is shown as separate from the other resources of the system 500, it will be appreciated that the storage system 440 may form part of the remote server 450, or another server such as an email server, or may be a virtual component associated with a cloud computing implementation of the system 500. In yet further examples, the storage system 440 may be located on another server in a different location than the remote server 450.

The system 500 comprises a remote server 450 which may be implemented in hardware, or may be an AWS server or other server provided by a cloud services provider; furthermore, multiple remote servers may be used, each being provided by separate cloud computing service providers to provide the services required to implement the method 200 described above. The remote server 450 may be configured on the same network as the sender and recipient devices 510, 530, or alternatively may be accessed via an external network such as the Internet. It will be appreciated that the remote server 450 may be on the same network as at least one of the sender or recipient devices 510, 530, for example where the remote server 450 belongs to an organization's network and the recipient and/or sender are part of that organization connecting to the organization's network using their respective devices. The sender and recipient devices 510, 530 may interact with the remote server 450 using an API (not shown). The API may be arranged to send and/or receive commands and data between the sender and recipient devices 510, 530, and the remote server 450.

The remote server 450 comprises at least some of the components for implementing method 200 described above in relation to FIG. 2. In particular, the remote server 450 may comprise a processor (not shown) configured to undertake processing on the electronic communication, and/or instantiate or configure at least one pseudo account such as pseudo accounts 300, 310. Other data used by the remote server 450 during the implementation of method 200 may be received directly from the storage system 440 as indicated by the dotted arrow or may in some embodiments be received via the network 520.

The remote server 450 comprises a number of modules 452, 454, 456, 458, **458*a*, 460, 462, and 464 arranged to implement the method 200 described above. These modules 452, 454, 456, 458, 458*a*, 460, 462, and 464 may be hardware-implemented or software-implemented and configured to implement at least some of the steps described above with reference to method 200**.

The remote server 450 comprises an input module 452 configured to receive at least the electronic communication from the sender who has transmitted the electronic communication to the recipient via a sending device 510. Upon receipt of the electronic communication, a determination module 454 associated with the remote server 450 is configured to determine, on receipt of the electronic communication, whether the electronic communication is potentially malicious. As described above with reference to FIG. 4, the analysis of the electronic communication to determine whether it is potentially malicious may be undertaken at another server, such as an email server, before invoking the remote server 450 to perform the other steps of method 200.

Determining whether the electronic communication is a potentially malicious communication may be undertaken in a number of different ways. For example, characteristics associated with previous malicious communications compared with characteristics associated with received electronic communication may be used as an indicator. Other examples of determining whether the electronic communication is a potentially malicious communication include analysing the data contained within the electronic communication, such as the sender address, other recipients, whether there is an attachment to the electronic communication, and the content of any message and/or attachment. Other features of the electronic communication may also be used to determine whether it is malicious, such as the time the electronic communication has been received, data in the header such as redirection information, and an analysis of any hyperlinks within the body of the electronic communication.

Analysing the electronic communication to determine whether it is a potentially malicious communication based on any of the above-mentioned data associated with the received electronic communication, may be undertaken by a machine learning algorithm. Other forms of analysis may also be used as will be appreciated by the skilled person. The analysis of the electronic communication may be based on a plurality of the data to obtain a holistic view as to whether the electronic communication poses a potential threat.

When it is determined that the electronic communication is potentially malicious, at least one pseudo account is instantiated by an instantiation module 456 of the remote server 450. The instantiation module 456 is configured to instantiate pseudo accounts with associated login credentials, for example, a first pseudo account 300 is instantiated with login credentials comprising randomly generated characters and no data, and/or a second pseudo account 310 is instantiated with dummy data representative of an account of the server system 500, and login credentials that are representative of the dummy login credentials for accessing a given account of the server system 500. Further details regarding the first and/or second pseudo accounts 300, 310 are described above in relation to FIGS. 3A and 3B, and also in relation to step 230 of method 200.

Following the instantiation of at least one pseudo account 300, 310 a transmission module 458 of the remote server 450 transmits at least the login credentials of the pseudo account(s) 300, 310 to the sending device 510. The transmission module 458 may be configured to transmit the login credentials via a network 520 such as a local area network (LAN), a general wide area network (WAN), and/or a public network (e.g. the Internet), using the previously described network adaptor (not shown).

Once at least the login credentials of the pseudo account(s) 300, 310 have been sent to the sending device 510, the remote server 450 monitors, using a monitoring module 458*a* for access to the at least one pseudo account 300, 310 using the associated login credentials by a third party who is not associated with any of the accounts maintained by the server system 500. The monitoring module 458*a* may also be configured to monitor for actions undertaken in the pseudo account(s) 300, 310.

The remote server 450 also comprises an association module 460 for generating an association between characteristics of the access to the pseudo account(s) 300, 310 and the pseudo account(s) 300, 310 themselves. It will be appreciated that a large number of characteristics may be associated with the access, including but not limited to the type of login credentials used for the access, identification information associated with the user accessing the pseudo account(s) 300, 310, and a time of the access to the pseudo account(s) 300, 310. The identification information associated with the user accessing the pseudo account(s) 300, 310 may include information such as an Internet Protocol (IP) address associated with the user's device, the geographic location of the user, and a domain associated with the source of the access. It will be appreciated that other characteristics may also be associated with the access.

In other examples, the characteristics may comprise information associated with one or more actions undertaken by the user when they have gained access to the pseudo account(s) 300, 310 using the login credential provided. Such actions include but are not limited to an attempt to send one or more electronic communications using the pseudo account(s) 300, 310, an attempt to download data associated with the pseudo account(s) 300, 310, and an attempt to change one or more administrative rules associated with the pseudo account(s) 300, 310 such as forwarding rules. Other actions may also be monitored and tracked.

Further information about the access may also be determined based on whether the login credentials of the first and/or second type for the first pseudo account 300 and the second pseudo account 310 respectively have been provided to one or more third parties via an online repository accessible via the Internet. For example, if the login credentials to either of the first or the second pseudo account 300, 310 are detected on known malicious sites, it can be determined that the request for data from the recipient was malicious. Characteristics of that request can then be stored and used when analysing further electronic communications as an indication that a given electronic communication may be malicious.

Once the association has been made between the characteristics and the pseudo account(s) 300, 310, an output module 462 outputs the association to the storage system 440. Whilst the example system 500 shown in FIG. 5 shows the storage system 440 interacting with the remote server 450 via a network connection, it will be appreciated that the output module 462 may interact with the storage system 440 of the remote server 450 via a direct connection as indicated by the dotted arrow.

Following the storage of the association in the storage system 440, the association can be used in future determinations to determine whether a request for data from a recipient is likely to be malicious, further improving the accuracy of the detection algorithms used by the determination module 454, for example.

In some examples, the remote server 405 may comprise an analysis module 464 configured to obtain data from one or more repositories 540 via a network 520 such as the Internet. The analysis module 464 analyses the data obtained from these repositories, which may be known to store login credentials that have been maliciously obtained, however, it will be appreciated that the repositories may also store other data. By monitoring such repositories, information about the purpose of the electronic communication 430 sent to the sender can be deduced and used to determine whether future electronic communications are malicious. By using the data from the online repositories 540, further information about accesses to the pseudo account(s) 300, 310 may also be gleaned based on whether the login credentials of the first and/or second type for the first pseudo account 300 and the second pseudo account 310 respectively have been provided to one or more third parties via the online repository 540. For example, if the login credentials associated with either of the first or the second pseudo account 300, 310 are detected on known malicious sites, it can be determined that the request for data from the recipient was malicious. Characteristics of that request can then be stored and used when analysing further electronic communications as an indication that a given electronic communication may be malicious.

In some examples, the remote server 450 may comprise a comparison module 466 to compare characteristics of the pseudo accounts 300, 310, this comparison may feed into an access determination module 468 configured to determine whether access to a given pseudo account is automated or whether it was undertaken by a real-world malicious third party. Determining whether the access was automated may be based on the pseudo account 300, 310 accessed and/or the type of login credentials used. Access to the first pseudo account 300, using the login credentials comprising randomly generated characters may be used to indicate that the access was automated. This is because no real-world malicious third party would analyse the pseudo account and its login credentials and consider them to be representative of a so-called real account. Conversely, if an access is detected to the second pseudo account 310, which comprises data that emulates a so-called 'real' account of the server system, and has login credentials of the second type representative of realistic login credentials as described above, this may be indicative of a real-world malicious third party accessing the second pseudo account 310.

The remote server 450 may also comprise an indication module 470 configured to generate an indication to be sent to the recipient device 530 to notify the recipient of the electronic communication of an attempt to access their authorized account. In such an example, the characteristics of the access to the pseudo account(s) 300, 310, such as the time of the access and the attempted actions, may be compared to previous access and/or action information associated with one or more given accounts of the server system, which are stored in a storage system associated with the server system 500. Similarities between the attempted access to the pseudo account(s) 300, 310, and previous access to one or more other accounts may then be used to determine whether the access has the hallmarks of a malicious access. An indication may then be transmitted to the recipient device 530 based on the comparison to alert them to the fact that an attempt to obtain data associated with their account has been prevented. Details regarding the attempt may be provided in the indication, such that the recipient can provide feedback indicating whether it is a malicious access attempt. The recipient's feedback may be stored in the storage system and then used to determine whether future attempts to access the recipient's authorized account (or other recipients with authorized accounts associated with the server system), which have similar characteristics, are malicious or not.

At least some aspects of the embodiments described herein with reference to FIGS. 1-5 comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

It is to be understood that although some of the disclosure above relates to the use of cloud computing, the implementation described is not limited to a cloud computing environment. Rather, embodiments of the present disclosure are capable of being implemented in conjunction with any other type of computing environment.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A method of determining unauthorised requests, from a sender, for data pertaining to a recipient of an electronic communication, the recipient being a user of, and having an authorized account with, a server system, wherein the server system comprises at least a remote server and a storage system, and maintains accounts for a plurality of users, the method comprising:

- receiving, at the remote server, the electronic communication addressed to the recipient;
- determining, by the remote server, that the electronic communication is a potentially malicious communication, and in response to determining that the electronic communication addressed to the recipient is potentially malicious:
  - instantiating, by the remote server, a first pseudo account specific to the recipient, with associated login credentials of a first type, wherein the remote server maintains the first pseudo account in the storage system as a separate account from the authorized account of the recipient, and wherein the first pseudo account is unused by the recipient and contains no data;
  - transmitting, to the sender of the electronic communication, by the remote server, at least the login credentials of the first type;
  - monitoring, by the remote server, access to the first pseudo account by a given user of the server system, using the login credentials of the first type, wherein;

the given user is not associated with any of the accounts maintained by the server system; and the monitoring comprises actively tracking, while the given user is accessing the first pseudo account, one or more actions as they are undertaken by the given user within the first pseudo account, the one or more actions comprising at least one of: sending a communication using the first pseudo account, downloading data from the first pseudo account, or attempting to modify or create administrative rules associated with the first pseudo account; and associating, by the remote server and in the storage system, at least one characteristic of the access, by the given user of the server system, to the first pseudo account with the login credentials of the first type, wherein the at least one characteristic of the access to the first pseudo account is used in determining unauthorised requests for the data.

2. The method of determining unauthorised requests for data according to claim 1, wherein the login credentials of the first type are login credentials comprising characters which have been randomly generated for use in accessing the first pseudo account.

3. The method of determining unauthorised requests for data according to claim 1, further comprising:

instantiating, by the remote server, at least a second pseudo account with associated login credentials of a second type, the second pseudo account being associated with, and unused by, the recipient, and wherein:

the second pseudo account is different to the authorized account and the first pseudo account;

the second pseudo account comprises dummy data representative of a given account of the server system; and the login credentials of the second type represent dummy login credentials for accessing the given account;

transmitting, to the sender of the electronic communication, by the remote server, the login credentials of the second type;

monitoring, by the remote server, access to the second pseudo account by the given user of the server system, with the login credentials of the second type; and associating by the remote server, and in the storage system, at least one characteristic of the access by the given user of the server system, to the second pseudo account with the login credentials of the second type, wherein the at least one characteristic of the access to the second pseudo account is used in determining unauthorised requests for the data.

4. The method of determining unauthorised requests for data according to claim 3, further comprising determining whether access, by the given user, to the first pseudo account or the second pseudo account is automated, based on a comparison of the at least one characteristic of the access to the first pseudo account by the given user, and the at least one characteristic of the access to the second pseudo account by the given user, wherein the at least one characteristic of the access to the first pseudo account and the at least one characteristic of the access to the second pseudo account are indicative of at least whether the login credentials are of the first type or the second type.

5. The method of determining unauthorised requests for data according to claim 3, further comprising analysing data that is accessible via the Internet from one or more repositories, to determine whether at least:

the login credentials of the first type, associated with the first pseudo account have been made available via the one or more repositories; or the login credentials of the second type, associated with the second pseudo account have been made available via the one or more repositories.

6. The method of determining unauthorised requests for data according to claim 3, wherein the at least one characteristic of the access to the first pseudo account and the at least one characteristic of the access to the second pseudo account comprises information associated with one or more actions undertaken by the given user.

7. The method of determining unauthorised requests for data according to claim 3, wherein the at least one characteristic of the access to the first pseudo account, and the at least one characteristic of the access to the second pseudo account is any of:

identification information associated with the given user accessing the first pseudo account with the login credentials of the first type or the given user accessing the second pseudo account with the login credentials of the second type; and a time associated with the access, by the given user, to the first pseudo account with the login credentials of the first type or the access to the second pseudo account with login credentials of the second type.

8. The method of determining unauthorised requests for data according to claim 7, further comprising determining a difference between a transmission time of the login credentials of the first type or the login credentials of the second type to the sender, and the time associated with the access to the first pseudo account or the access to the second pseudo account by the given user.

9. The method of determining unauthorised requests for data according to claim 8, wherein when the difference is below a predetermined threshold, it is determined that the given user is the sender of the electronic communication.

10. The method of determining unauthorised requests for data according to claim 7, further comprising determining a time period between the time associated with the access to the first pseudo account or the access to the second pseudo account by the given user, and an action time associated with an action undertaken by the given user in the first pseudo account or the second pseudo account.

11. The method of determining unauthorised requests for data according to claim 1, further comprising:

identifying previous access characteristics stored in the storage system, the previous access characteristics being associated with previous accesses to one or more accounts of the server system;

comparing the previous access characteristics to the characteristics associated with the access to the first pseudo account by the given user of the server system to determine a similarity between the previous access to the one or more accounts of the server system and the access to the first pseudo account by the given user; and transmitting an indication to the recipient based on the comparison.

12. A server system for determining unauthorised requests from a sender for data pertaining to a recipient of an electronic communication, the recipient being a user of, and having an authorized account with, the server system, wherein the server system maintains accounts for a plurality of users, the server system comprising:

a sending device operable by the sender of the electronic communication to transmit the electronic communication to the recipient;

a recipient device for receiving at least the electronic communication from the sender;

a storage system; and a remote server for facilitating communication between the sending device and the recipient device, wherein the remote server comprises:

an input module configured to receive, from the sending device, the electronic communication addressed to the recipient;

a determination module for determining that the electronic communication is a potentially malicious communication;

an instantiation module for instantiating, in response to determining that the electronic communication addressed to the recipient is potentially malicious, a first pseudo account with associated login credentials of a first type, wherein the remote server maintains the first pseudo account in the storage system as a separate account from the authorized account of the recipient, and wherein the first pseudo account is unused by the recipient and contains no data;

a transmission module for transmitting, to the sending device, at least the login credentials of the first type;

a monitoring module for monitoring access to the first pseudo account by a given user of the server system, using the login credentials of the first type, wherein;

the given user is not associated with any of the accounts maintained by the server system; and the monitoring comprises actively tracking, while the given user is accessing the first pseudo account, one or more actions as they are undertaken by the given user within the first pseudo account, the one or more actions comprising at least one of: sending a communication using the first pseudo account, downloading data from the first pseudo account, or attempting to modify or create administrative rules associated with the first pseudo account;

an association module for generating an association between at least one characteristic of the access, by the given user of the server system, to the first pseudo account with the login credentials of the first type;

an output module for outputting, to the storage system, the association, wherein the at least one characteristic of the access to the first pseudo account is used in determining unauthorised requests for the data.

13. The server system for determining unauthorised requests for data according to claim 12, wherein the login credentials of the first type are login credentials comprising characters that have been randomly generated for use in accessing the first pseudo account.

14. The server system for determining unauthorised requests for data according to claim 12, wherein:

the instantiation module instantiates a second pseudo account with associated login credentials of a second type, the second pseudo account being associated with, and unused by, the recipient, and wherein:

the second pseudo account is different to the authorized account and the first pseudo account;

the second pseudo account comprises dummy data representative of a given account of the server system; and the login credentials of the second type represent dummy login credentials for accessing the given account;

the transmission module transmits, to the sending device, at least the login credentials of the second type;

the monitoring module monitors for access to the second pseudo account by the given user of the server system, using the login credentials of the second type;

the association module generates an association between at least one characteristic of the access, by the given user of the server system, to the second pseudo account with the login credentials of the second type, wherein the at least one characteristic of the access to the second pseudo account is used in determining unauthorised requests for the data.

15. The server system for determining unauthorised requests for data according to claim 14, wherein the remote server further comprises:

a comparison module for comparing the at least one characteristic of the access to the first pseudo account by the given user with the at least one characteristic of the access to the second pseudo account by the given user, wherein the at least one characteristic of the access to the first pseudo account and the at least one characteristic of the access to the second pseudo account are indicative of at least whether the login credentials are of the first type or the second type; and an access determination module for determining whether access, by the given user, to the first pseudo account or the second user account is automated based on the comparison.

16. The server system for determining unauthorised requests for data according to claim 14, wherein the remote server further comprises an analysis module configured to:

obtain data from one or more repositories via the Internet; and analyse the obtained data to determine whether at least:

the login credentials of the first type, associated with the first pseudo account, have been made available via the one or more repositories; or the login credentials of the second type, associated with the second pseudo account, have been made available via the one or more repositories.

17. The server system for determining unauthorised requests for data according to claim 14, wherein the remote server further comprises an indication module configured to:

identify previous access characteristics stored in the storage system, the previous access characteristics being associated with previous accesses to one or more accounts of the server system;

compare the previous access characteristics to the characteristics associated with the access to the first pseudo account by the given user of the server system to determine a similarity between the previous access to the one or more accounts of the server system and the access to the first pseudo account by the given user; and transmit an indication to the recipient based on the comparison.

18. A non-transitory computer-readable storage medium comprising a set of computer-readable instructions stored thereon which, when executed by at least one processor cause the processor to determine unauthorised requests from a sender for data pertaining to a recipient of an electronic communication, the recipient being a user of, and having an authorized account with, a server system, wherein the server system comprises at least a remote server and a storage system, and maintains accounts for a plurality of users, and wherein the instructions comprise:

receiving, at a remote server, the electronic communication addressed to the recipient;

determining, by the remote server, that the electronic communication is a potentially malicious communication, and in response to determining that the electronic communication addressed to the recipient is potentially malicious:

instantiating, by the remote server, a first pseudo account specific to the recipient with associated login credentials of a first type, wherein the remote server maintains the first pseudo account in the storage system as a separate account from the authorized account of the recipient, and wherein the first pseudo account is unused by the recipient and contains no data;

transmitting, to the sender of the electronic communication, by the remote server, at least the login credentials of the first type;

monitoring, by the remote server, access to the first pseudo account by a given user of the server system, using the login credentials of the first type, wherein the given user is not associated with any of the accounts maintained by the server system; and the monitoring comprises actively tracking, while the given user is accessing the first pseudo account, one or more actions as they are undertaken by the given user within the first pseudo account, the one or more actions comprising at least one of: sending a communication using the first pseudo account, downloading data from the first pseudo account, or attempting to modify or create administrative rules associated with the first pseudo account; and associating, by the remote server and in a storage system, at least one characteristic of the access, by the given user of the server system, to the first pseudo account with the login credentials of the first type, wherein the at least one characteristic of the access to the first pseudo account is used in determining unauthorised requests for the data.

* * * * *